UNITED STATES PATENT OFFICE.

FERDINAND GERHARD WIECHMANN, OF NEW YORK, N. Y., ASSIGNOR TO PROTAL COMPANY, A CORPORATION OF MAINE.

PROCESS OF TREATING VEGETABLE ALBUMEN AND ANIMAL CASEIN AND THE PRODUCT THEREFROM.

932,527.  Specification of Letters Patent.  Patented Aug. 31, 1909.

No Drawing.  Application filed November 2, 1907. Serial No. 400,402.

*To all whom it may concern:*

Be it known that I, FERDINAND GERHARD WIECHMANN, a citizen of the United States, residing at New York city, county and State of New York, have invented a Process of Treating Vegetable Albumen and Animal Casein and the Product Therefrom, of which the following is a specification.

In my Patent No. 883,995, dated April 7, 1908, I have described a process of treating vegetable albumen with animal casein to bring about a chemical combination and produce a product which in many respects simulates rubber.

The product so obtained, may primarily be either a plastic, semi-solid or solid body. In each form, the product is heavier than water, and if subjected to the action of water for some time, will be somewhat affected.

The purpose of my present invention is First: to change the specific gravity of the final product from one heavier than water to one lighter than water. Second: to render such product impervious to the action of moisture or water.

The process by which the product is obtained, which is described in my former application, consists in subjecting vegetable albumen to the action of a solution of animal casein.

To carry my present invention into effect, the product of such process is first brought into a state of fine division in any suitable manner, as by scraping, cutting or shredding, after which it is immersed in a solution of hydrogen peroxid of approximately three (3%) per cent. strength; or, I may immerse such divided body in a solution in which hydrogen peroxid is generated in the nascent state, from chemicals or by electrolytic action. Within a few minutes after immersion in the hydrogen peroxid, about 3 to 9 minutes, the body lightens perceptibly in color, at times even becoming white, and rises to the surface of the solution. It is then at once removed and pressed or molded into any form desired, and dried. In this condition, the material exhibits and retains its lighter color and possesses a specific gravity less than that of water, so that it will float on water.

To render the product impervious to moisture or water, I immerse the product, either in its primary state or in its secondary state, *i. e.*, after molding, in a solution of formaldehyde of about forty (40%) per cent. (formalin) and leave the body immersed therein for from 10 minutes to two (2) hours. The material is then removed and dried. This renders the body entirely waterproof.

I may apply the process of waterproofing described, with or without the product having been subjected to the treatment with hydrogen peroxid above described, or I may employ the hydrogen peroxid treatment or the formaldehyde treatment, together or independently, in any sequence as I may prefer.

The final product produced by the process described, finds many uses in the arts, for instance, I may make golf balls and other articles commonly formed of rubber, celluloid or other materials which will float upon water; further, the final product forms an efficient binding material, by reason of which many substances used for abrading purposes; such, for instance, as carborundum, emery, sand, pulverized glass, pumice stone,—in connection with water or oil—may be given form, such, for instance, as disks or wheels.

In practice, I have found that the product itself has an abrading value, which especially fits it for use in connection with abrading materials as above described.

Having thus described my invention, I claim:

1. The process of treating the product of the character described to render it lighter than water, which consists in subjecting it to the action of hydrogen peroxid.

2. The process of treating the product of the character described to render it lighter than water, which consists in subjecting it while in a finely divided condition to the action of hydrogen peroxid.

3. The process of treating the product of the character described to render it impervious to moisture or water, which consists in subjecting it to the action of formaldehyde.

4. The process of treating the product of the character described to render it lighter than water and impervious to moisture or water, which consists in subjecting it to the action of hydrogen peroxid and formaldehyde.

5. The process of treating the product of the character described to render it lighter than water and impervious to moisture or water, which consists in first subjecting it while in a finely divided condition to the action of hydrogen peroxid and subsequently to the action of formaldehyde.

6. The product of the process described, which consists of a body formed from vegetable albumen and animal casein and having a specific gravity less than that of water.

7. The product of the process described which consists of a body formed of vegetable albumen and animal casein and impervious to the action of water.

8. A body of the character specified formed of vegetable albumen and animal casein lighter than water and impervious to the action of moisture or water.

In testimony whereof, I affix my signature, in the presence of two witnesses.

FERDINAND GERHARD WIECHMANN.

Witnesses:
M. TURNER,
PAUL H. MORROW.